United States Patent
Jarosch et al.

(10) Patent No.: US 8,929,818 B2
(45) Date of Patent: Jan. 6, 2015

(54) USER-CONTROLLED METHOD AND SYSTEM FOR MODIFYING THE RADIATION OF A WIRELESS DEVICE IN ONE OR MORE USER-SELECTED VOLUMES

(75) Inventors: Andreas Jarosch, Allenwinden (CH); Carolin Latze, Bern (CH); Thomas Zasowski, Zurich (CH)

(73) Assignee: Swisscom AG (CH)

( * ) Notice: Subject to any disclaimer, the term of this patent is extended or adjusted under 35 U.S.C. 154(b) by 427 days.

(21) Appl. No.: 13/328,153

(22) Filed: Dec. 16, 2011

(65) Prior Publication Data

US 2012/0196535 A1 Aug. 2, 2012

(30) Foreign Application Priority Data

Jan. 28, 2011 (EP) .................................... 11152621

(51) Int. Cl.
  *H04B 7/00* (2006.01)
  *H04W 4/02* (2009.01)
  *H04B 7/06* (2006.01)
  *H04W 84/12* (2009.01)

(52) U.S. Cl.
  CPC ............. *H04W 4/022* (2013.01); *H04B 7/0617* (2013.01); *H04W 84/12* (2013.01)
  USPC ........... 455/41.2; 455/41.3; 455/25; 455/522; 455/68; 455/69; 455/561; 342/359; 342/360; 342/367; 342/368; 342/371; 342/372; 342/374

(58) Field of Classification Search
  USPC ........... 455/25, 41.2, 68, 69, 522, 561, 562.1, 455/101, 41.3; 342/367, 368, 359, 360, 342/361, 372, 374, 378, 371
  See application file for complete search history.

(56) References Cited

U.S. PATENT DOCUMENTS 6,590,546 B2 * 7/2003 Heinz et al. .................... 343/853
7,133,645 B2 * 11/2006 Thermond .................... 455/67.7

(Continued)

FOREIGN PATENT DOCUMENTS

EP    0488824 A2    6/1992
EP    1381246 A1    1/2004

(Continued)

OTHER PUBLICATIONS

Tila F et al.: Indoor Ray Tracing Evaluation of Enhanced High Frequency Communications Using Directional Antennas at the Basestation and Space Diversity at the Terminal, Microwave Conference, 2001, 31st European, IEEE, Piscataway, NJ, USA, Sep. 24, 2001, pp. 1-5, XP031605926.

(Continued)

*Primary Examiner* — Tuan A Tran
(74) *Attorney, Agent, or Firm* — McAndrews, Held & Malloy, Ltd.

(57) ABSTRACT

A user-controlled method for modifying the radiation of a wireless device (1) in one or more volumes used for in-house communications, comprising
  user-selecting this one or more volumes (10, 10', 10", 10''', $10^{IV}$) while holding the orientation of this wireless device (1)
  modifying the intensity of this radiation in one or more directions so as to control the radiation in this user-selected one or more volumes (10, 10', 10", 10''', $10^{IV}$).
The invention allows the user to define volumes or regions where radiation should be modified, e.g. reduced, and one or more temporal intervals in which this radiation should be reduced.

14 Claims, 4 Drawing Sheets

(56) References Cited

U.S. PATENT DOCUMENTS

| | | | |
|---|---|---|---|
| 8,024,002 B2 * | 9/2011 | Kitakado | 455/562.1 |
| 8,055,302 B2 * | 11/2011 | Chen et al. | 455/562.1 |
| 8,265,552 B2 * | 9/2012 | Kamel et al. | 455/25 |
| 8,301,094 B2 * | 10/2012 | Ahn et al. | 455/132 |
| 8,385,978 B2 * | 2/2013 | Leung et al. | 455/562.1 |
| 8,559,330 B2 * | 10/2013 | Fox | 370/252 |
| 2007/0129071 A1 | 6/2007 | Shapira | |
| 2009/0013257 A1 | 1/2009 | Wang | |
| 2009/0280750 A1 | 11/2009 | Rofougaran et al. | |
| 2010/0296439 A1 | 11/2010 | Leung et al. | |

FOREIGN PATENT DOCUMENTS

| | | | |
|---|---|---|---|
| EP | 2197238 A1 | 6/2010 | |
| EP | 2228868 A1 | 9/2010 | |
| GB | 2361385 A | 10/2001 | |
| WO | 9522210 A2 | 8/1995 | |
| WO | 2004019622 A2 | 3/2004 | |

OTHER PUBLICATIONS

Fortune S.J. et al.: "WISE Design of Indoor Wireless Systems: Practical Computation and Optimization", IEEE Computational Science & Engineering, IEEE Computer Society, US, vol. 2, No. 1, Jan. 1, 1995, pp. 58-68, XP002175089.

Barry D. Van Veen et al.: "Beamforming: A Versatile Approach to Spatial Filtering", IEEE ASSP Magazine, Apr. 1988, p. 4-24.

Partial European Search Report for EP 11 15 2621 dated May 13, 2011.

* cited by examiner

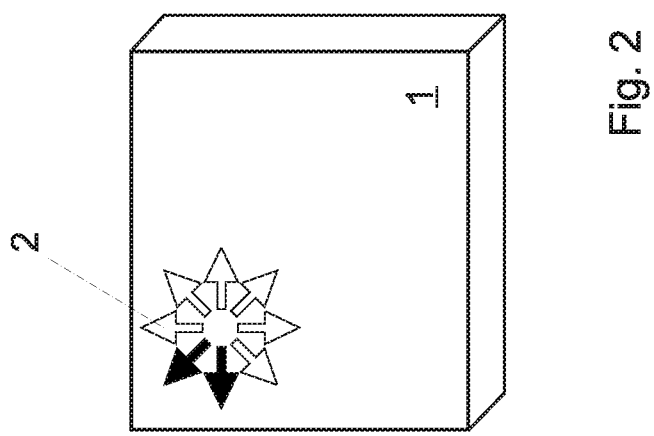

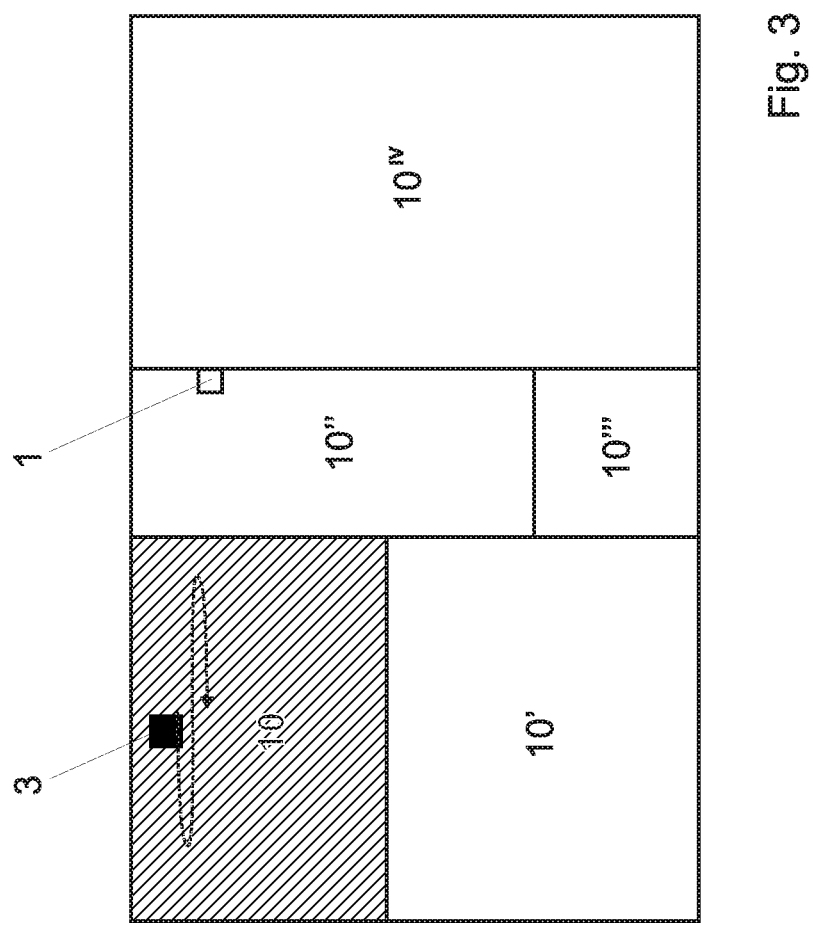

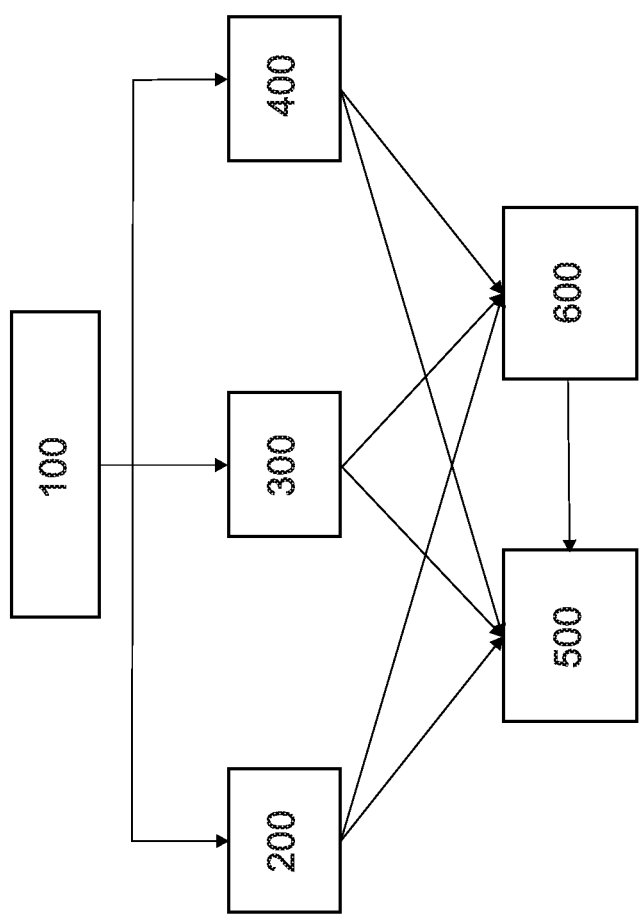

USER-CONTROLLED METHOD AND SYSTEM FOR MODIFYING THE RADIATION OF A WIRELESS DEVICE IN ONE OR MORE USER-SELECTED VOLUMES

REFERENCE DATA

The present application claims priority from European patent application EP11152621.6 of Jan. 28, 2011, the contents whereof are hereby incorporated.

FIELD OF THE INVENTION

The present invention concerns a user-controlled method and system for modifying the radiation of a wireless device in one or more user-selected volumes.

DESCRIPTION OF RELATED ART

In the past, most wireless radio sending devices radiated almost in an omnidirectional way, i.e. in all directions, to achieve good signal coverage. With the advent of technologies like beamforming, wireless devices have become able to improve the signal quality on selected directions resulting in the reduction of radiation in other non-selected directions. However the directions selection depends on fully automatic approaches related to optimization criteria, i.e. rate increase or interference cancellation. In other words a user has no direct possibility to select afterwards the volumes or regions, i.e. the rooms of an apartment, parts of rooms, parts of an apartment, etc. in which radiations should be modified, i.e. reduced or augmented, and/or to influence the optimization criterion, e.g. the desired method, according to his/her needs.

Some known wireless devices allow the user to set limits to the maximum transmission power in order to reduce the power consumption. This results in a limitation of the emission range in the useful direction, and in insufficient reduction in other directions where emission is useless or even detrimental.

Thus there is no easy way in the prior art for a user to define volumes or regions that should remain "radiation-free", be it either temporarily or forever. Such a user controlled definition of radiation-free regions would be useful for avoiding or minimizing interference in regions where a wireless signal is not necessary. For example, in an apartment, it is usually useless and undesirable to have a wireless sending device radiates in the bathroom and/or the bedroom. Some user may also want to reduce the radiation in the living room at night.

The document US20070293178 describes a configurable antenna linked with an antenna control system for WiFi applications. The antenna comprises selectable RF elements, each of which has own individual gain and a directional radiation pattern, some of which can be activated in order to send an RF signal in the direction of the specific instance of a client. The antenna's elements can be automatically selected in various combinations. However the user has no possibility to select or manually control the antenna RF elements.

The document US20060038734 describes a system and method for an omnidirectional planar antenna apparatus with selectable elements, e.g. dipoles, each of which has gain and a directional pattern. Switching different elements results in a configurable radiation pattern which can be offset in direction. Again, the user has not the possibility to adjust or control manually the antenna apparatus.

The document EP2228868 describes a wireless device, e.g. a laptop, for LAN which can radiate at different radiation patterns in response to the detection of a change in the device position. As the user moves the device in another room or the angle of the mobile device vis-à-vis the access point changes, the detecting element, e.g. a tilt sensor or an accelerometer, sends a signal to a processor that selects an antenna configuration by using an antenna element selector. In this device, it is the processor, and not the user, which selects a suitable antenna's configuration.

The document B. D. Van Veen and K. M. Buckley: "*Beamforming: A Versatile Approach to Spatial Filtering*", IEEE *ASSP MAGAZINE*, April 1998, describes an overview of beamforming techniques from a signal processing perspective.

The document WO2004019622 concerns a method and a system for multi-cell interference reduction in a cellular system. The domain of this document is different from the WLAN domain or from the domain of home or private local area network. In order to estimate the interfering signals, the base station designates a small active window during which the communications between the base station and its terminals are reduced. Based on the detected characteristics of the interfering signals, the base station can specifically design beamforming mechanisms or other means for cancelling or minimizing the impact of such interference during regular communications. This document does not disclose any indications about the possibility for a user to actively modify the impact of the interference during regular communications, since this is automatically made by the base station.

The document US20090280750 describes a method for power management in a beamforming system. In order to make electronic devices (transmitters and receivers) for mobile communications more power efficient, portions of transmitters and/or receivers are enabled or disabled based on the strength of the undesired components of the received signals, the SNR of the desired components or a user selected power mode. The selection of the user allows the power control, however it does not allow the control of the direction of the radiation beam nor the selection of one or more regions or volumes in which radiation should be modified. Again, this document relates to mobile communications and not to WLAN or home/private local area network.

The document US20090013257 describes a network device comprising a press key portion and a display unit. The press key portion comprises a wakeup key and a configuration key. When the network device is turned on, the display unit allows the user to learn about the status of the device and set its specific status by using the configuration key. Therefore user can view the information about the network device and save its power. However the setting of the status of the device does not comprise the definition of regions or volumes in which radiation should be reduced or otherwise modified.

It is an aim of the present invention to obviate or mitigate one or more of the aforementioned disadvantages.

BRIEF SUMMARY OF THE INVENTION

According to the invention, these aims are achieved by means of a user-controlled method for modifying the radiation of a wireless device in one or more volumes used for in-house communications, by means of a user-controlled WLAN system for modifying the radiation of a wireless device in one or more volumes used for in-house communications and by means of a support wireless device used for in-house communications.

In this context the expression "wireless device used for in-house communications" designates, but it is not limited to, a wireless radio device used and managed by consumers for establishing a data and/or voice network in their apartments or in small and home offices or in large offices or business campus. Examples of wireless devices according to this definition include WLAN access point, DSL (Digital Subscriber Line) modem incorporating a wireless WIFI sender, fibre modem incorporating a WLAN access point, wireless bridges for wireless TV transmission, DECT base stations, USB wireless adapters, femtocells devices, Bluetooth transmitters and other similar devices. The invention is in particular adapted for wireless radio sending devices with a range between a few meters to max 100 meters.

Advantageously the method according to the invention comprises:
  user-selecting one or more volumes while holding the orientation of the wireless device
  modifying the intensity of radiation in one or more directions so as to control the radiation of the wireless device in the user-selected one or more volumes.

The expression "while holding the orientation of the wireless device" clarifies that the user selection of this one or more volumes is performed without rotating or moving the whole wireless device. In one example the wireless device has a fixed position and it is connected to Internet by a wired connection. Therefore the position of the wireless device is not changed during this selection.

In another example the wireless device can have a round section and a movable top part comprising an arrow. The movable part is an interface for the user allowing the selection of the volumes in which the radiation should be modified. For example the user can press and rotate the movable part of the device, and consequently different directions—corresponding to the directions of the arrow—could be marked and stored in the wireless device. The device then can keep the directions and learn about volumes wherein no signal should be transmitted. In such a case only a part of the wireless device is rotated.

In one embodiment the radiation of the wireless device is reduced in the corresponding selected volumes: the user then can define volumes which should remain "radiation-free", be it either temporarily or forever. Such a user controlled definition of radiation-free volumes is useful for avoiding or minimizing interference in volumes or regions where a wireless signal is not necessary or not desired.

In one embodiment the modification of the radiation in one or more volumes is performed by applying a beamforming method or a combination of beamforming methods. In fact beamforming methods can modify the intensity of the radiation in certain directions.

In one preferred embodiment the user selects and/or modifies this beamforming method or combination of beamforming methods: the user in fact can influence the beamforming method(s) on the wireless device by defining further limitations such as the maximum desired data rate, the maximum signal strength, etc. and the method(s) has to consider the constraints given by the user.

In one embodiment the user can also define one or more temporal interval in which the radiation of the wireless device is modified in one or more volumes: for example it is then possible to reducing the radiation in the living room at night.

In one embodiment the selection of the volumes wherein the intensity of the radiation should be modified is performed by the user by manipulating one or more haptic means on the wireless device. In this context the expression "haptic means" indicates any system or means which performs a function if it is touched by a user or by other means such as a stylus. Examples of haptic means comprise buttons or a touchscreen. In one preferred embodiment the wireless device comprises as haptic means two or more buttons, for example in an arrow form corresponding to volumes, e.g. rooms of an apartment. By pressing an arrow button the signal radiation in the corresponding volume is modified, for example reduced. This can be indicated by illuminating the button in a different color than the remaining buttons. It is also possible to press any combination of the buttons. Selecting one or more haptic means on the wireless device allows the user to easily control the volume(s) in which the radiation should be modified.

According to another embodiment, the selection of the volumes wherein the radiation should be modified is performed by using another wireless device, called in the following support wireless device. In such a case, the wireless device which transmits the radiation has to perform according to one among two available operational modes, i.e. a setup mode and a transmit mode. In particular, for all the volumes in which the radiation should be modified
  a support wireless device is placed in one or more points of the volume
  the setup mode of the wireless device is activated
  information about this volume is communicated from the support wireless device to the wireless device
  the support wireless device is switched off
  the transmit mode of the wireless device is activated.

In one embodiment, during the setup mode the wireless device receives some information, e.g. a training sequence, from the support wireless device and consequently it modifies its beamforming means, e.g. its beamforming weights, in order to send a null or a really weak signal to the support wireless device when the transmit mode is activated.

The steps of activating the setup or transmit mode of the wireless device and of switching off the support wireless device can be performed by the user or automatically. In one embodiment the support wireless device is placed in one or more border points of the considered volume. In another embodiment, a single support wireless device is used for all the volumes in which radiation should be modified, for example the rooms of an apartment: in other words the support wireless device is mobile and can be moved from a room to another by the user. In another embodiment each volume or room comprises a fixed support wireless device which can communicate with the wireless device. This embodiment is more expensive since several support wireless devices are used instead of one, but is more practical for the user who does not have to move a single support wireless device in different rooms.

The use of one or more support wireless devices instead of or in addition to haptic means on the wireless device for selecting the volumes wherein the radiation should be modified is more complicated but allows to achieve a more accurate results.

According to another embodiment, the support wireless device can be placed by the user in a room of an apartment and can detect in this room the intensity of the radiation of the wireless device if this radiation is strong enough. This level is communicated to the user by means of some communicating means like LEDs or illuminating buttons or a display and the user can send to the wireless device via the support wireless device a request of modifying this signal level, e.g. by using a plus or minus button for requesting to rise respectively reduce the signal level.

According to a further embodiment, the selection of the volumes wherein the radiation should be modified is performed by the user by means of instructions executed on a calculator, integrated for example—but not limited to—in a personal computer, a laptop, a PDA (Personal Digital Assistant), a smart-phone, a mobile phone, etc. connected to the wireless device by any wired or wireless link.

Advantageously the invention relates also to a user-controlled WLAN system for modifying the radiation of a wireless device in one or more volumes used for in-house communications, comprising means for user-selecting this one or more volumes while holding the orientation of the wireless device this wireless device comprising a circuit executing a beamforming method or a combination of beamforming methods for modifying the intensity of the radiation in one or more directions so as to control the radiation in the use-selected volume(s).

The acronym "WLAN", i.e. Wireless Local Area Network, in this context designates in particular a home or private wireless local area network, but not necessarily the IEEE 802.11 WLAN.

In one embodiment the means for user-modifying comprise haptic means on the wireless device, as discussed above. Those haptic means can be used by the user for selecting the volume(s) in which the intensity of the radiation should be modified.

In another embodiment these means comprise a support wireless device communicating with the wireless device: in such a case the wireless device can execute two operational modes, a setup and a transmit mode, and the communication with the support wireless device is performed when the wireless device's setup mode is activated, the activation being performed by the user or automatically.

In a further embodiment these means for user-selecting one or more volumes in which the radiation of the wireless device should be reduced comprise a calculator connected to the wireless device in which are executed instructions allowing the user to select the volume(s) in which the intensity of the radiation should be modified.

In one embodiment the wireless device comprises one or more directional and/or selectable antennas, such as a part of an antennas' array, for modifying the intensity of the radiation in one or more directions. In another embodiment the wireless device comprising means for digitally modifying the intensity of the radiation in one or more directions so as to control this radiation in the user-selected volume(s).

According to a further embodiment the wireless device comprises means for allowing the user to define one or more temporal intervals in which the radiation of the wireless device is modified in one or more directions.

The invention concerns also a support wireless device used for in-house communications, comprising means for communicating with a wireless device means for detecting the intensity of the radiation of this wireless device means for communicating this detected intensity radiation to a user means for receiving a request from this user to modify this detected intensity radiation means for sending to this wireless device this request.

According to a further embodiment, the method and the system according to the invention allow the user to define different levels of signal power in different volumes. It is possible then to define for example a level 1, corresponding to a low signal power, in a first room, and a level 3, corresponding to a high signal power, in a second room.

BRIEF DESCRIPTION OF THE DRAWINGS

The invention will be better understood with the aid of the description of an embodiment given by way of example and illustrated by the figures, in which:

FIG. 2 shows a view of one embodiment of the wireless device according to the invention, comprising haptic means allowing the selection of the direction(s) in which the radiation of the wireless device should be modified.

FIG. 3 shows a view of the floor plan of an exemplary apartment in which the method according to the invention can be performed, and of regions and directions relative to the device in which the radiation of the illustrated wireless device should be modified by using the illustrated support wireless device.

FIG. 4 shows a schematic overview of examples of different options of the method according to the invention.

DETAILED DESCRIPTION OF POSSIBLE EMBODIMENTS OF THE INVENTION

Figure 1:
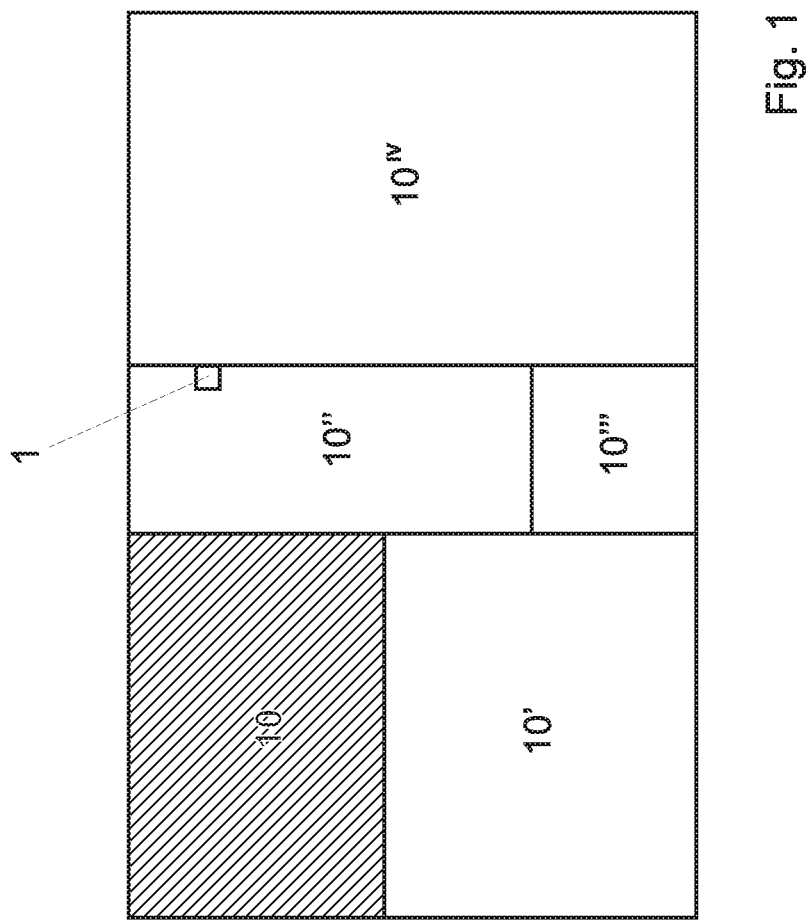
FIG. 1 shows a view of the floor plan of an exemplary apartment in which the method according to the invention can be performed, and of different regions and directions relative to the device in which the radiation of the illustrated wireless device should be modified.

FIG. 1 shows a view of the floor plan of an exemplary apartment in which the method according to the invention can be performed, and of the volume(s) in which the intensity of the radiation of a wireless device 1 should be modified, for example reduced or increased.

In fact it is possible that a user installing a wireless device 1, e.g. an access point, does not want to have the same signal strength or power in his/her whole apartment. As depicted in FIG. 1, the signal strength shall be e.g. smaller in one room of the apartment either to reduce interference, reduce exposure of persons to radiations, reduce the power consumption of the device, increase the intensity in other directions, or for any other reasons when no wireless signal is needed or wanted in a room.

The apartment illustrated in FIG. 1 comprises one floor such that all its rooms are on the same floor. However the method according to the invention can be applied also in the case wherein the apartment comprises two or more floors; in this case, the control of the intensity of the radiations is affected not only in a horizontal plane, but in three dimensions so as to modify the intensity of the radiation in the different floors.

In one embodiment, one or more haptic means 2, acting as selection mechanism, together with a visual indicator are placed on the wireless device 1. In the example in FIG. 2, this mechanism is placed on the top of the wireless device 1 and consists of buttons, e.g. eight buttons, in an arrow form. By pressing an arrow button 2 the signal radiation in the direction of the arrow corresponding to a volume shall be reduced. This can be indicated by illuminating the button 2 in a different colour than the remaining buttons. It is also possible to press any combination of the buttons 2. Alternatively, the intensity of the radiation is increased in the volume corresponding to the selected button. In yet another embodiment, the intensity of the radiation in one room is progressively or step-by-step modified while one button is pressed or otherwise selected.

The information on the selected buttons is forwarded to the wireless device 1. In one embodiment the wireless device 1 executes a beamforming method or a combination of beamforming methods that optimizes signal cancellation. In any case the wireless device 1 comprises means for considering the constraints given by the user selection.

In one embodiment the transmit unit contains several antennas such that beamforming can be applied. The antennas can be either directional antenna where beamforming is realized using antenna selection or the antennas can have another characteristics and beamforming is done digitally. The beamforming can be realised in any other known way.

According to another embodiment the wireless device 1 can support two or more operational modes, e.g. a setup mode and an operational mode. In contrast to the previous haptic means-based approach, this approach requires a so called "support wireless device 3" in addition to the wireless device 1. When a user wants to define one or more volumes, e.g. a room, where he/she wants to modify the radiation, as shown in FIG. 3 the user can place the support wireless device 3 into one or more border points of that room indicated by the gray area and switches it on. Afterwards, the user can put the wireless device 1 into the setup mode e.g. by pressing an appropriate button on the wireless device 1. According to another embodiment, the wireless device 1 is automatically put in the setup mode by the presence of the support wireless device 3.

During this setup phase, the wireless device 1 will learn about the room corresponding to the volume where its radiation should be reduced by using the support wireless unit 3, as optionally indicated by the dashed arrow on FIG. 3.

In one embodiment, during the setup mode the wireless device 1 receives some information, e.g. a training sequence, from the support wireless device 3 and consequently it modifies its beamforming means, e.g. its beamforming weights, in order to send a null or a really weak signal to the support wireless device 3 when the transmit mode is activated.

After the wireless device 1 has learned about that room and configured for example the beamforming method accordingly, it can indicate the end of the setup phase e.g. by a blinking LED. Now, in one embodiment the user can switch off the support wireless device 3, which puts the wireless device 1 into operational mode. In another embodiment the wireless device 1, after the room learning, automatically switches off the support wireless device 3 and activates the operational mode.

It is not essential that the wireless device 1 knows the room; it could just try to modify the beamforming in order to reduce the intensity of the signal received by the support wireless device 3. In fact according to one embodiment the support wireless device 3 can be used even if the wireless device 1 has only one operational mode, e.g. the transmit mode. In this case, the support wireless device 3 acts as a kind of remote control to tell the wireless device 1 to modify the intensity where the support wireless device 3 is. In other words the support wireless device 3 could be an emitter that sends toward the wireless device 1. This wireless device 1 adapts the beamforming of the signal received by support wireless device 3 with the antennas, so as to get the desired strength from each direction.

If there is no communication anymore between the support wireless device 3 and the wireless device 1, the support wireless device 3 can store the current parameters (for example the current time) and then be connected to the wireless device 1, for example over USB. In another embodiment when a communication between the two devices 1 and 3 is restored, the wireless device 1 checks the stored parameters and modifies the radiation accordingly.

According to a further embodiment, the selection of the volumes wherein the radiation should be modified is performed by the user by means of instructions executed on a calculator, not illustrated, integrated for example—but not limited to—in a personal computer, a laptop, a PDA (Personal Digital Assistant), a smart-phone, a mobile phone, etc. connected to wireless device 1 by any wired or wireless link. In this case, it would be possible in one embodiment to enter a plan of the apartment in the software, possibly with indications about the thickness and material of the walls etc. A simulation can then be performed in order to guess how to adapt the beamforming. Additionally, this simulation can be combined with measures taken from a support wireless device 3.

For any method used for selecting the volume(s) in which radiation should be modified, the user can also define further limitations e.g. in the form of operation profiles. These operation profiles can be e.g. a lowest power mode that minimizes radiation and number of beacons while guaranteeing reliable transmission. Another possibility is a high performance mode: such a mode is of interest when new wireless devices are added to the network and the required transmit power to associate them is not known. The radiation could also be adjusted in such way that a pre-defined throughput is guaranteed. Users can control themselves the desired operation profile via haptic means 2 on the wireless device 1.

In general, different combinations of the above mentioned methods are possible. For instance a user could define profiles where no signals are sent to different volumes for specific times, i.e. the signal could be sent in all the rooms of an apartment during the day but not to sleeping rooms at night.

FIG. 4 shows a schematic overview of examples of different options of the method 100 according to the invention. As discussed, the method can use a support wireless device 3 (option 200), or haptic means 2 on the wireless device 1 (option 300) or any other option 300, for example connecting a calculator to the wireless device 1 for performing the volumes' user-selection. Each option allows the user to give further limitations (e.g. maximum data rate 400) which the beamforming method(s) have to take into account (reference 500).

The invention allows the implementation of the so-called "eco-mode" for wireless systems as e.g. WLAN. The eco-mode can consist of different options, illustrated in FIG. 4 by the references 200 to 400, that can be each activated individually. Also any combination of these methods is possible. In general those methods are referred to as methods where users have to manually define volumes in their environment, e.g. a house, where radiation of wireless signals shall be reduced. An eco-mode for wireless systems, as e.g. WLAN implies also a reduction of power consumption of the wireless system, which is optimised according to the user's needs.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

What is claimed is:

1. A method for modifying the intensity of radiation of a wireless device in the direction of one or more volumes used for in-house communications, comprising the steps of
   selecting said one or more directions while maintaining the orientation of said wireless device; and
   modifying the intensity of said radiation in one or more of said directions and thereby controlling said radiation in said corresponding volumes;
   wherein, for directions in which said intensity of radiation should be modified, said selecting comprising:
      placing a support wireless device in a volume corresponding to a direction;
      activating a setup mode of said wireless device;
      communicating information from said support wireless device to said wireless device;

switching off said support wireless device; and
activating a transmit mode of said wireless device.

2. The method of claim 1, said modifying comprising the step of applying a beamforming method or a combination of beamforming methods.

3. The method of claim 2, said modifying comprising the step of selecting and/or modifying of said beamforming method or said combination of beamforming methods.

4. The method of claim 1, said modifying comprising the step of defining one or more temporal intervals during which said intensity of said radiation is modified in said one or more directions.

5. The method of claim 1, said selecting comprising the step of selecting one or more haptic means on said wireless device.

6. The method of claim 1, said selecting comprising the step of connecting a calculator to said wireless device and performing said selection by using instructions executed in said calculator causing the user to select said one or more directions.

7. A system for modifying the intensity of radiation of a wireless device in the direction of one or more volumes used for in-house communications, comprising
means for selecting said directions while maintaining the orientation of said wireless device;
wherein said wireless device comprises a circuit for modifying the intensity of said radiation in one or more directions and thereby controlling the radiation in corresponding one or more volumes, and means for executing a setup mode and a transmit mode; and
wherein said means for selecting comprises a support wireless device communicating with said wireless device during said setup mode.

8. The system of claim 7, said means for selecting comprising haptic means on said wireless device and/or a visual indicator.

9. The system of claim 7, said means for selecting comprising a calculator connected to said wireless device executing instructions causing the user to select said one or more directions.

10. The system of claim 7, said wireless device comprising one or more directional and/or selectable antennas and/or an antenna array.

11. The system of claim 7, said circuit for modifying said intensity is a circuit for digitally executing beamforming method or beamforming methods.

12. The system of claim 7, said wireless device comprising means for defining one or more temporal intervals during which said intensity of said radiation is modified in said one or more volumes.

13. The system of claim 7, said wireless device being a WLAN access point or a DSL modem or a fibre modem or a wireless bridge for wireless TV transmission.

14. A support wireless device used for in-house communications, comprising
means for communicating with a wireless device;
means for detecting the intensity of the radiation of said wireless device;
means for communicating said detected intensity radiation to a user;
means for receiving a request from said user to modify said detected intensity radiation;
means for sending to said wireless device said request.

* * * * *